US012066285B2

(12) United States Patent
Lin

(10) Patent No.: US 12,066,285 B2
(45) Date of Patent: Aug. 20, 2024

(54) HOIST AND WINCH CABLE ANGLE SENSOR

(71) Applicant: Goodrich Corporation, Charlotte, NC (US)

(72) Inventor: Chuang-Chia Lin, Diamond Bar, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 286 days.

(21) Appl. No.: 17/650,358

(22) Filed: Feb. 8, 2022

(65) Prior Publication Data

US 2022/0155061 A1    May 19, 2022

Related U.S. Application Data

(60) Division of application No. 15/983,413, filed on May 18, 2018, now Pat. No. 11,268,807, which is a continuation of application No. 13/839,099, filed on Mar. 15, 2013, now Pat. No. 9,989,358.

(51) Int. Cl.
*G01B 11/26* (2006.01)
*B66C 13/04* (2006.01)

(52) U.S. Cl.
CPC ............... *G01B 11/26* (2013.01); *B66C 13/04* (2013.01)

(58) Field of Classification Search
CPC ................................. G01B 11/26; B66C 13/04
See application file for complete search history.

(56) References Cited

U.S. PATENT DOCUMENTS

| 3,826,380 | A | * | 7/1974 | Lenander | ............ | B66C 13/063 |
| | | | | | | 340/685 |
| 4,106,156 | A | * | 8/1978 | Fisher | .................... | B66D 1/36 |
| | | | | | | 254/389 |
| 4,414,476 | A | | 11/1983 | Maddox et al. | | |
| 4,988,193 | A | | 1/1991 | Cain et al. | | |
| 5,078,333 | A | | 1/1992 | Hester | | |
| 6,538,252 | B1 | | 3/2003 | Pleva et al. | | |
| 6,811,112 | B1 | | 11/2004 | Currie et al. | | |
| 6,929,210 | B2 | | 8/2005 | Sandler et al. | | |
| 8,141,260 | B2 | | 3/2012 | Pellen | | |
| 2005/0179020 | A1 | | 8/2005 | Taylor et al. | | |
| 2009/0313844 | A1 | | 12/2009 | Swanson et al. | | |
| 2010/0201970 | A1 | * | 8/2010 | Pellen | .................... | G01B 11/26 |
| | | | | | | 356/138 |

FOREIGN PATENT DOCUMENTS

GB    2303837 A * 3/1997 ............... B64D 1/22

* cited by examiner

*Primary Examiner* — Tarifur R Chowdhury
*Assistant Examiner* — Akbar H. Rizvi
(74) *Attorney, Agent, or Firm* — Kinney & Lange, P. A.

(57) ABSTRACT

An assembly includes a hoist or a winch, a cable, and a fleet angle sensor. The fleet angle sensor includes a frame disposed around an opening and the cable extends through the opening. A first photodetector with multiple light-receiving zones is mounted on the frame. A first light source is mounted on the frame opposite the first photodetector. A shield device is under the frame and includes a shield frame and a cover. The shield frame is around the cable and the cover extends from the shield frame toward the cable, with the cable extending through the cover.

4 Claims, 5 Drawing Sheets

HOIST AND WINCH CABLE ANGLE SENSOR

CROSS-REFERENCE TO RELATED APPLICATION(S)

This application is a divisional application of U.S. application Ser. No. 15/983,413 filed May 18, 2018 for "HOIST AND WINCH CABLE ANGLE SENSOR."

U.S. application Ser. No. 15/983,413 is a continuation of U.S. application Ser. No. 13/839,099 filed Mar. 15, 2013 for "HOIST AND WINCH CABLE ANGLE SENSOR."

BACKGROUND

Hoist and winches are commonly used on helicopters and ships to haul, pull, raise, and lower heavy loads. Winches include a drum that supports a spool of cable that runs to the load, usually through one or more sheaves. The cable may be formed of steel or rope depending upon the use and environment of the winch. The winch spools and unspools the cable by rotating the drum. As the cable is taken in it is spooled onto the drum in multilayers. Cable or hoist/winch damage could occur as the cable is spooled if the fleet angle between the cable and the spool axis becomes too large, causing the cable to drag over adjacent wraps. Excessive fleet angle can also induce severe safety concern to the helicopter if the cable tangles with the body of the helicopter. External forces can also damage the hoist and winches if its fleet angle is too large. Such external forces could include wind, drag as the load at the end of the cable is pulled through water, or forces caused by the motor as the motor spools and unspools the cable.

Fleet angle is the angle between the center axis of alignment and the cable. Generally the center axis of alignment is defined as the axis where the cable would hang straight down if no other force other than gravity were acting upon it. By maintaining an acceptable fleet angle, the drum of the winch can spool the cable without causing the cable to drag over and wear adjacent wraps. In the past, a mechanical tracking device referred to as a follower has been used to guide the cable as the cable is spooled and unspooled. However, followers are prone to small timing errors that accumulate as the cable changes in diameter over time and use. The fleet angle of the cable may also be controlled through drum controls that vary the rotational speed of the drum, but the drum controls require sensors that are able to provide accurate, real-time measurements of the fleet angle of the cable.

In some applications, obtaining accurate, real-time measurements of the fleet angle of the cable is challenging because the cable is constantly vibrating, swaying, or bouncing. One such application is sonar dipping. In sonar dipping, a winch is mounted to a helicopter. The winch lowers an electric supporting cable with a specialized sonar for submersion in water to detect the presence of submarines. To take measurements at spaced intervals, the winch repeatedly raises and lowers the sonar at high speeds averaging about five meters per second. Because of the rapid and erratic movement of the cable, there is a need for a fleet angle sensor with high resolution and fast response time to accurately measure the fleet angle of the cable.

SUMMARY

In one aspect of the invention, an assembly includes a winch, a cable, and a fleet angle sensor. The fleet angle sensor includes a frame disposed around an opening and the cable extends through the opening. A first photodetector with multiple light-receiving zones is mounted on the frame. A first light source is mounted on the frame opposite the first photodetector. A shield device is under the frame and includes a shield frame and a cover. The shield frame is around the cable and the cover extends from the shield frame toward the cable, with the cable extending through the cover.

In another aspect of the invention, an angle sensor includes a frame and a first light source disposed on the frame. A first quadrant photodiode is disposed on the frame opposite the first light source. A second light source is disposed on the frame and a second quadrant photodiode is disposed on the frame opposite the second light source. A circuit is connected to the first and second quadrant photodiodes and determines an angular orientation of a cable passing through the frame based on signals from the first and second quadrant photodiodes. A shield device is under the frame and includes a shield frame and a cover. The cover extends from the shield frame toward a center axis of the angle sensor.

DETAILED DESCRIPTION

The present invention provides a fleet angle sensor with fast response time and high enough resolution to measure the fleet angle of a cable within one tenth of a degree. The fleet angle sensor includes a frame with an opening for receiving the cable, a quadrant photodiode mounted on the frame, and a light source mounted on the frame to direct a light beam across the opening to the quadrant photodiode. The quadrant photodiode is connected to a circuit that determines the fleet angle of the cable based on signals from the quadrant photodiode.

Figure 1:
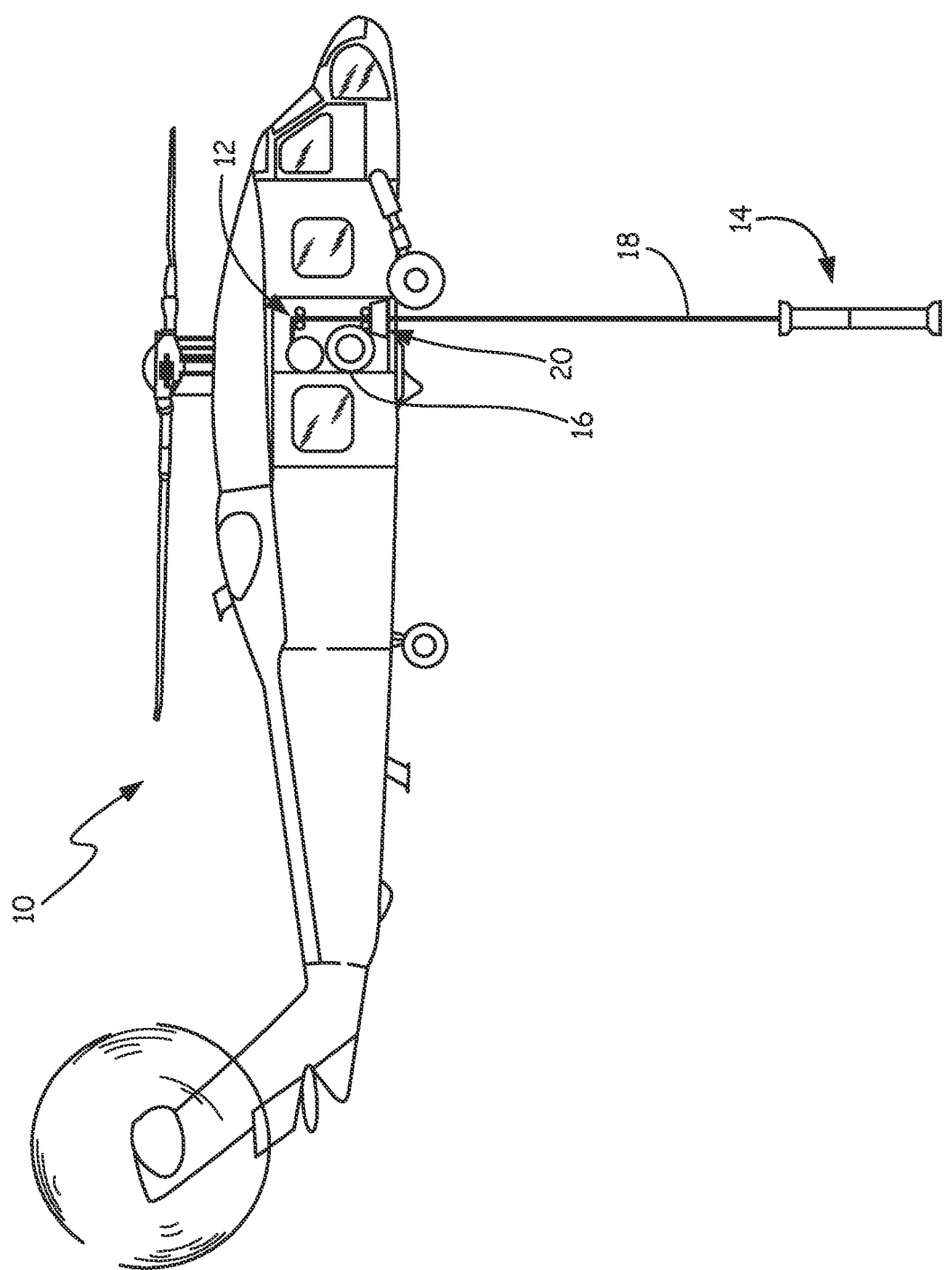
FIG. 1 is a side view of a helicopter with a cable winch.

FIG. 1 is a side view of helicopter 10 with winch assembly 12 supporting load 14. As shown in FIG. 1, winch assembly 12 includes winch 16, cable 18, and fleet angle sensor 20. Winch 16 is mounted to helicopter 10 and raises and lowers load 14 by taking in or paying out cable 18. Though FIG. 1 shows load 14 as a dipping sonar, load 14 may include any object connected to cable 18 and moved by winch 16. Fleet angle sensor 20 is connected below winch 16. As discussed below in FIG. 2, cable 18 passes through fleet angle sensor 20 so that fleet angle sensor 20 may measure the fleet angle of cable 18.

Figure 2:
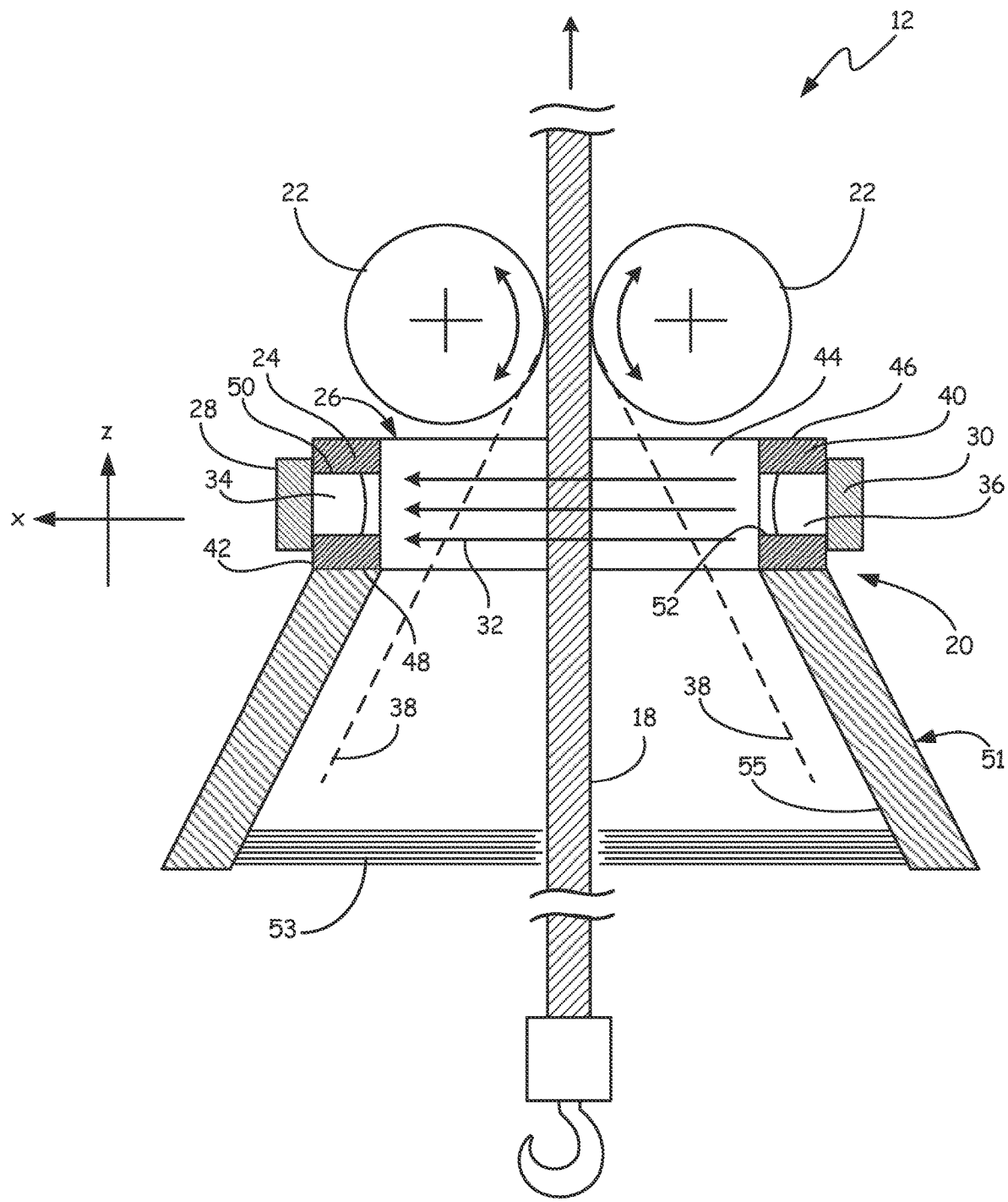
FIG. 2 is a cross-sectional view of a fleet angle sensor and sheaves from the cable winch of FIG. 1.

FIG. 2 is a cross-sectional view of sheaves 22 and fleet angle sensor 20 from winch assembly 12 of FIG. 1. As shown in FIG. 2, winch assembly 12 includes cable 18, fleet angle sensor 20, and sheaves 22. Fleet angle sensor 20 includes frame 24, opening 26, first photodetector 28, first light source 30, first light beam 32, first lens 34, and second lens 36. Maximum angle range 38 defines the full range of cable 18 on the x-axis relative to the z-axis. Frame 24 includes annular ring 40, outer circumferential surface 42, inner circumferential surface 44, top surface 46, bottom surface 48, first bore 50, and second bore 52. Fleet angle sensor 20 may also include shield device 51 with bristles 53 and inside surface 55.

Cable 18 passes between sheaves 22 before passing across fleet angle sensor 20 through opening 26. Sheaves 22 center cable 18 above fleet angle sensor 20 such that cable 18 is collinear with a center axis of fleet angle sensor 20 when frame 24 is horizontal and no other force other than gravity is acting upon cable 18. Sheaves 22 also prevent cable 18 from rubbing against frame 24 of fleet angle sensor 20 by defining a pivot point of cable 18 just above fleet angle sensor 20. Frame 24 of fleet angle sensor 20 is disposed around opening 26 forming annular ring 40 with outer circumferential surface 42, inner circumferential surface 44, top surface 46 and bottom surface 48. Inner circumferential surface 44 is several times larger in diameter than cable 18 so that opening 26 is sufficiently large to accommodate maximum angle range 38 of cable 18. Maximum angle range 38 is the maximum fleet angle that cable 18 is likely to experience on any side of the center axis of fleet angle sensor 20. As shown in FIG. 2, the maximum fleet angle that cable 18 is likely to experience is fifteen to twenty degrees from the center axis of fleet angle sensor 20. First bore 50 extends through outer circumferential surface 42 and inner circumferential surface 44 of frame 24. Second bore 52 also extends through outer circumferential surface 42 and the inner circumferential surface 44 opposite first bore 50 and is diametrically aligned with first bore 50.

First photodetector 28 is disposed on outer circumferential surface 42 over first bore 50, and first light source 30 is disposed on outer circumferential surface 42 over second bore 52 opposite first photodetector 28. First light source 30 directs first light beam 32 through second bore 52, across opening 26, and through first bore 50 to first photodetector 28. First light source 30 may be a laser, LED, diode laser, infrared emitter, ultraviolet emitter, incandescent bulb, or any other instrument capable of generating light. Cable 18 intersects first light beam 32, and as cable 18 moves and shifts within opening 26, the intensity of first light beam 32 on first photodetector 28 changes and first photodetector 28 produces signals representative of the intensity changes in first light beam 32. As discussed in greater detail below with reference to FIGS. 5A-7, first photodetector 28 is a quadrant photodiode with multiple light-receiving zones. The multiple light-receiving zones together detect the changes in first light beam 32 caused by cable 18 to determine the location of cable 18 within opening 26 and a fleet angle of cable 18. First light beam 32 is larger in diameter than cable 18 so that cable 18 never fully blocks first light beam 32 from first photodetector 28. Second lens 36 may be disposed in second bore 52 to collimate first light beam 32. In the case where first light source 30 is the same size or smaller in diameter than cable 18, second lens 36 may be a projection lens to enlarge first light beam 32 to make first light beam 32 larger in diameter than cable 18. Because first light beam 32 is larger in diameter than cable 18, second bore 52 also is larger in diameter than cable 18 to accommodate first light beam 32. First lens 34 may be disposed in first bore 50 to collimate first light beam 32 before it contacts first photodetector 28. In the case where first lens 34 only collimates first light beam 32, first photodetector 28 is larger in diameter than cable 18 so that cable 18 never fully shadows first photodetector 28 from first light beam 32. First photodetector 28 may be smaller in diameter than cable 18 when first lens 34 is a collection lens larger in diameter than cable 18. As a collection lens, first lens 34 focuses first light beam 32 onto first photodetector 28 where first photodetector 28 detects changes in focused first light beam 32. Because first photodetector 28 or first lens 34 must be larger in diameter than cable 18 to prevent cable 18 from fully shadowing first photodetector 28 from first light beam 32, first bore 50 also is larger than cable 18 to accommodate first photodetector 28 and first lens 34. As described below in FIGS. 3 and 4, second photodetector 54 and second light source 56 may be disposed on frame 24.

Shield device 51 is disposed under frame 24 proximate bottom surface 48 of frame 24 and blocks ambient light, water, dirt, and other contaminants from entering opening 26 and interfering with fleet angle sensor 20. Bristles 53 extend from inside surface 55 of shield device 51 towards the center axis of fleet angle sensor 20. Bristles 53 may be arranged in multiple layers so as to block ambient light from entering opening 26. As winch assembly 12 takes in or pays out cable 18, cable 18 rubs against bristles 53 to remove water, dirt, or other contaminants that may be present on cable 18. Bristles 53 are flexible such that bristles 53 contact cable 18 without restricting the motion of cable 18. While shield device 51 has been described as including bristles 53 to block light, water, dirt, and other contaminants from entering opening 26, shield device may employ other means to block contaminants from entering opening 26, such as a flexible diaphragm with a hole to accommodate cable 18.

Figure 3:
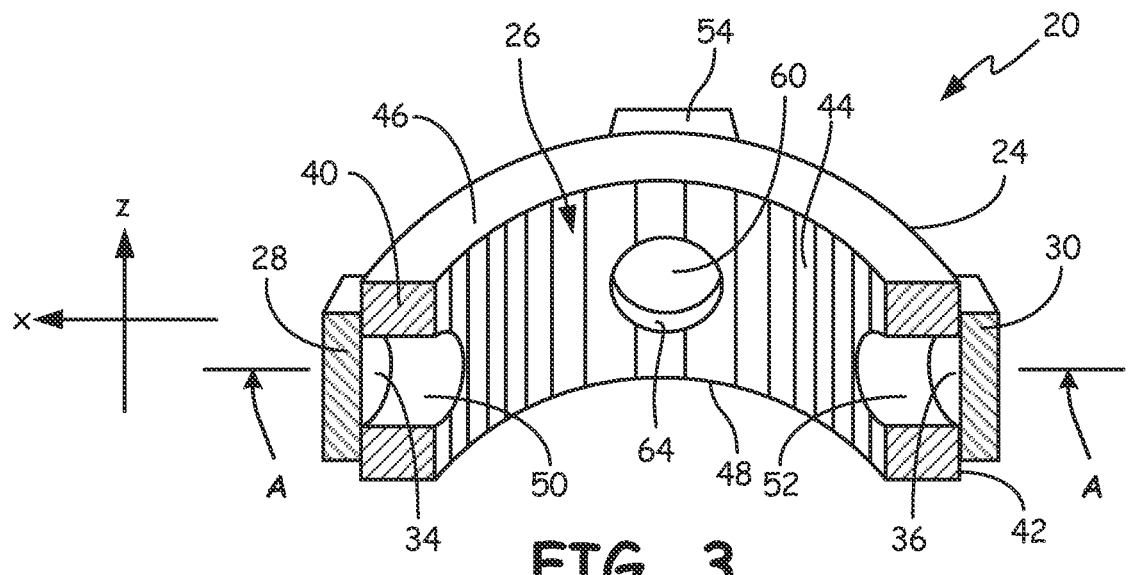
FIG. 3 is a perspective cross-sectional view of the fleet angle sensor from FIG. 2.
Figure 4:
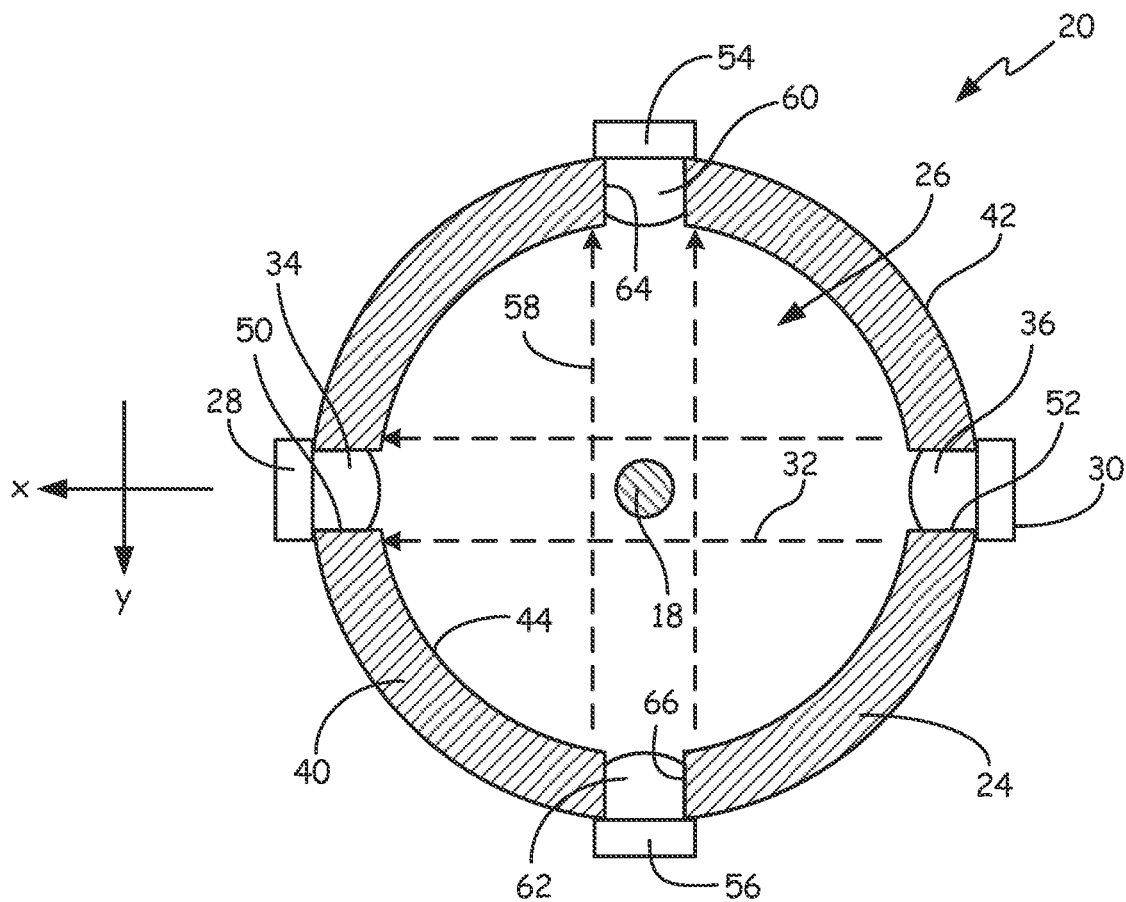
FIG. 4 is a cross-sectional view of the fleet angle sensor from FIG. 3 taken along line AA.

FIG. 3 is a perspective cross-sectional view of fleet angle sensor 20 from FIG. 2. FIG. 4 is a cross-sectional view of fleet angle sensor 20 from FIG. 3 and cable 18 taken along line AA. As shown in FIGS. 3 and 4, fleet angle sensor includes frame 24, opening 26, first photodetector 28, first light source 30, first light beam 32, first lens 34, second lens 36, second photodetector 54, second light source 56, second light beam 58, third lens 60, and fourth lens 62. Frame 24 includes annular ring 40, outer circumferential surface 42, inner circumferential surface 44, top surface 46, bottom surface 48, first bore 50, second bore 52, third bore 64, and fourth bore 66.

In FIGS. 3 and 4, components of like numbering with the components of FIG. 2 are assembled as discussed above with reference to FIG. 2. Third bore 64 extends through outer circumferential surface 42 and inner circumferential surface 44 of frame 24. Fourth bore 66 also extends through outer circumferential surface 42 and the inner circumferential surface 44 opposite third bore 64 and is diametrically aligned with third bore 64. Third bore 64 and fourth bore 66 are circumferentially positioned on frame 24 ninety degrees from first bore 50 and second bore 52. Second photodetector 54 is disposed on outer circumferential surface 42 over third bore 64, and second light source 56 is disposed on outer circumferential surface 42 over fourth bore 66 opposite second photodetector 54. First light source 30 is circumferentially positioned on frame 24 ninety degrees from second light source 56, and first photodetector 28 is circumferentially positioned on frame 24 ninety degrees from second photodetector 54. Second light source 56 directs second light beam 58 through fourth bore 66, across opening 26, and through third bore 64 to second photodetector 54. Similar to first light source 30, second light source 56 may be a laser, LED, diode laser, infrared emitter, ultraviolet emitter, incandescent bulb, or any other instrument capable of generating light. Cable 18 intersects second light beam 58, and as cable 18 moves and shifts within opening 26, the intensity of second light beam 58 on second photodetector 54 changes and second photodetector 54 produces signals representative of the intensity changes in second light beam 58. As discussed in greater detail below with reference to FIGS. 6A-8, second photodetector 54 is a quadrant photodiode with multiple light-receiving zones. The multiple light-receiving zones together detect the changes in second light beam 58 caused by cable 18 to determine the location of cable 18 within opening 26 and a fleet angle of cable 18. Second light beam 58 is larger in diameter than cable 18 so that cable 18 never fully blocks second light beam 58 from second photodetector 54. Fourth lens 62 may be disposed in fourth bore 66 to collimate second light beam 58. In the case where second light source 56 is the same size or smaller in diameter than cable 18, fourth lens 62 may be a projection lens to enlarge second light beam 58 to make second light beam 58 larger in diameter than cable 18. Because second light beam 58 is larger in diameter than cable 18, fourth bore 66 also is larger in diameter than cable 18 to accommodate second light beam 58. Third lens 60 may be disposed in third bore 64 to collimate second light beam 58 before it contacts second photodetector 54. In the case where third lens 60 only collimates second light beam 58, second photodetector 54 is larger in diameter than cable 18 so that cable 18 never fully shadows second photodetector 54 from second light beam 58. Second photodetector 54 may be smaller in diameter than cable 18 when third lens 60 is a collection lens larger in diameter than cable 18. As a collection lens, third lens 60 focuses second light beam 58 onto second photodetector 54 where second photodetector 54 detects changes in focused second light beam 58. Because second photodetector 54 or third lens 60 must be larger in diameter than cable 18 to prevent cable 18 from fully shadowing second photodetector 54 from second light beam 58, third bore 64 also is larger than cable 18 to accommodate second photodetector 54 and third lens 60.

Second light beam 58 is orthogonal to first light beam 32 and may intersect first light beam 32. First light source 30, first light beam 32, and first photodetector are aligned and define an x-axis for locating cable 18 within opening 26 of fleet angle sensor 20. Second light source 56, second light beam 58, and second photodetector 54 are aligned and define a y-axis for locating cable 18 within opening 26 of fleet angle sensor 20. The z-axis of fleet angle sensor 20 is the direction parallel to the center axis of fleet angle sensor and cable 18 is parallel with the z-axis when the fleet angle of cable 18 is zero, as shown in FIG. 4. Because first photodetector 28 is aligned with the x-axis and faces orthogonal with the y-axis, first photodetector 28 detects the position of cable 18 on the y-axis. Conversely, because second photodetector 54 is aligned with the y-axis and faces orthogonal with the x-axis, second photodetector 54 detects the position of cable 18 on the x-axis. First light beam 32 and second light beam 58 are each at least twice as large in diameter as cable 18. Because first light beam 32 and second light beam 58 are much larger in diameter than cable 18, first light beam 32 and second light beam 58 together generally encompass the full range of movement of cable 18 on an x-axis-y-axis plane within opening 26. Because first light beam 32 and second light beam 58 are each at least twice as large in diameter as cable 18, first photodetector 28 and second photodetector 54 may each be at least twice as large in diameter as cable 18. Similarly, first lens 34, second lens 36, third lens 60, and fourth lens 62 may each be at least twice as large in diameter as cable 18.

To determine the fleet angle of cable 18, fleet angle sensor 20 must first detect a first set of x, y, and z coordinates of cable 18 relative to a second set of x, y, and z coordinates of cable 18. Because sheaves 22 center cable 18 above fleet angle sensor 20, as discussed above with reference to FIG. 2, it is known that the position of cable 18 at sheaves 22 has a fixed position with a y-coordinate set to zero, an x-coordinate set to zero, and a z-coordinate set to a known non-zero value. Because the position of first photodetector 28 and second photodetector 54 along the z-axis inside fleet angle sensor 20 is also fixed and known, the second z-coordinate of cable 18 is known and fixed. Therefore, to find the fleet angle of cable 18, fleet angle sensor 20 only needs to detect a y-coordinate and an x-coordinate of cable 18 on the x-axis-y-axis plane that intersects the second z-coordinate of cable 18 inside opening 26 of fleet angle sensor 20. As discussed below with reference to FIGS. 5A-5C, first photodetector 28 detects the y-coordinate of cable 18 inside fleet angle sensor 20.

Figure 5A:
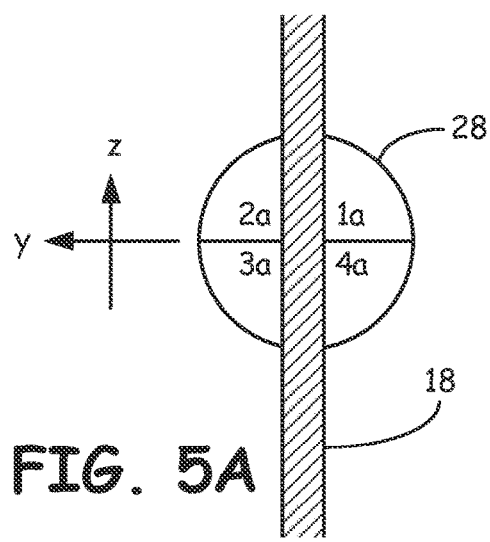
FIG. 5A is a front view of a first photodetector from the fleet angle sensor of FIG. 4 and a cable with a fleet angle of zero.
Figure 5B:
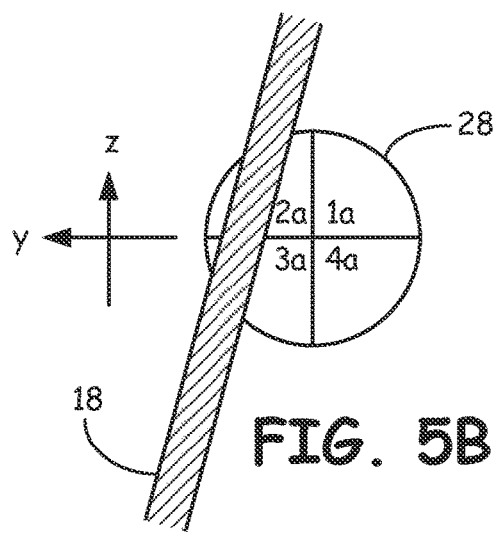
FIG. 5B is a front view of the first photodetector from FIG. 5A and the cable with a fleet angle greater than zero.
Figure 5C:
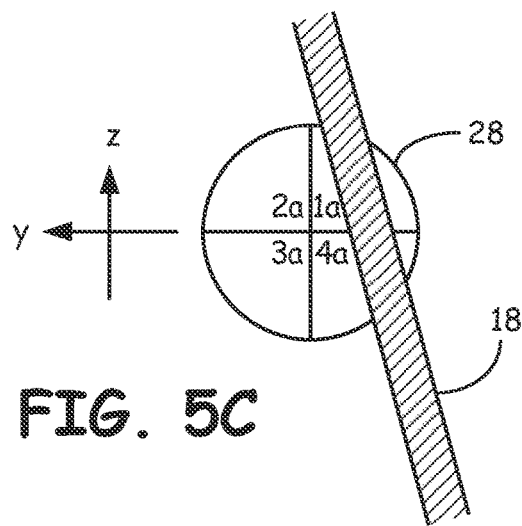
FIG. 5C is another front view of the first photodetector from FIG. 5A and the cable with a fleet angle greater than zero.

FIGS. 5A-5C will now be discussed concurrently. FIG. 5A is a front view of first photodetector 28 from fleet angle sensor 20 of FIG. 4 and cable 18 with a fleet angle of zero. FIGS. 5B and 5C are front views of first photodetector 28 from FIG. 5A and cable 18 with a fleet angle greater than zero. As shown in FIGS. 5A-5C, first photodetector 28 includes multiple light-receiving zones designated as quadrant 1a, quadrant 2a, quadrant 3a, and quadrant 4a.

As discussed above with reference to FIG. 2, first photodetector 28 may be a quadrant photodiode. First photodetector 28 may be circular with quadrant 1a, quadrant 2a, quadrant 3a, and quadrant 4a arranged such that quadrant 1a forms the northeast quadrant of first photodetector 28, quadrant 2a forms the northwest quadrant of first photodetector 28, quadrant 3a forms the southwest quadrant of first photodetector 28, and quadrant 4a forms the southeast quadrant of first photodetector 28. A small gap aligned with the y-axis separates quadrants 1a and 2a from quadrants 3a and 4a. A small gap aligned with the z-axis and the center line of fleet angle sensor 20 separates quadrant 1a from quadrant 2a, and also separates quadrant 3a from quadrant 4a. When no other force other than gravity acts upon cable 18, cable 18 is aligned between quadrant 1a and 2a, and between quadrant 3a and 4a, and first photodetector 28 detects that the position of cable 18 on the y-axis is at zero. As shown in FIG. 5B, should cable 18 swing left relative the z-axis, cable 18 partially shadows quadrants 2a and 3a while quadrants 1a and 4a are fully exposed. As described in greater detail in FIG. 7, first photodetector 28 determines a coordinate of cable 18 on the y-axis between quadrants 2a and 3a by comparing a signal generated by quadrant 1a to a signal generated by quadrant 2a, and also by comparing a signal generated by quadrant 4a to a signal generated by quadrant 3a. As shown in FIG. 5C, should cable 18 swing right relative the z-axis, cable 18 partially shadows quadrants 1a and 4a while quadrants 2a and 3a are fully exposed. As described in greater detail in FIG. 7, first photodetector 28 determines a coordinate of cable 18 on the y-axis between quadrants 1a and 4a by comparing a signal generated by quadrant 1a to a signal generated by quadrant 2a, and also by comparing a signal generated by quadrant 4a to a signal generated by quadrant 3a. As discussed below with reference to FIGS. 6A-6C, second photodetector 54 detects the x-coordinate of cable 18 inside fleet angle sensor 20.

Figure 6A:
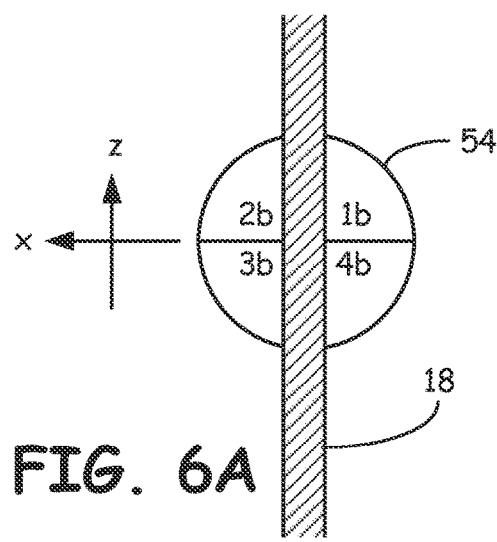
FIG. 6A is a front view of a second photodetector from the fleet angle sensor of FIG. 4 and the cable with a fleet angle of zero.
Figure 6B:
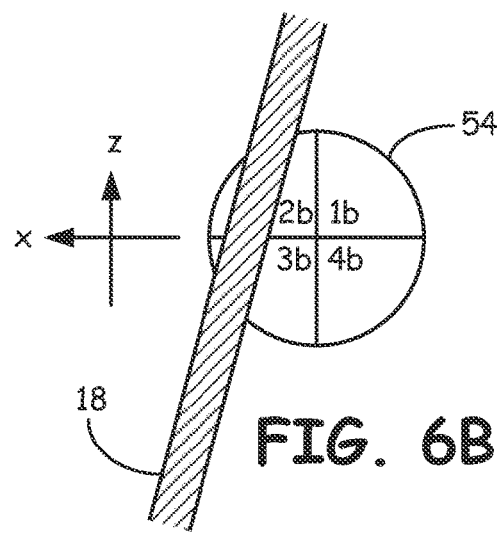
FIG. 6B is a front view of the second photodetector from FIG. 6A and the cable with a fleet angle greater than zero.
Figure 6C:
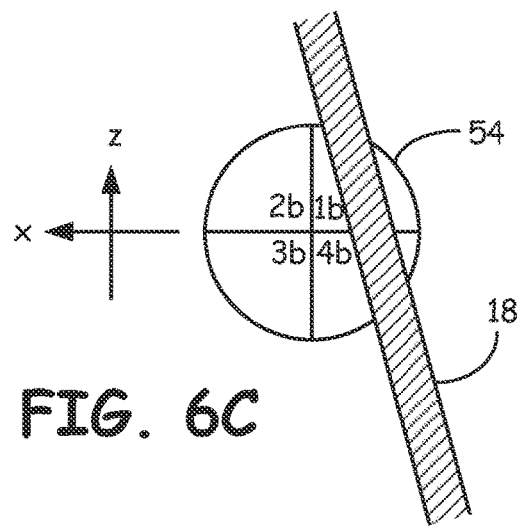
FIG. 6C is another front view of the second photodetector from FIG. 6A and the cable with a fleet angle greater than zero.

FIGS. 6A-6C will now be discussed concurrently. FIG. 6A is a front view of second photodetector 54 from fleet angle sensor 20 of FIG. 4 and cable 18 with a fleet angle of zero. FIGS. 6B and 6C are front views of second photodetector 54 from FIG. 6A and cable 18 with a fleet angle greater than zero. As shown in FIGS. 6A-6C, second photodetector 54 includes multiple light-receiving zones designated as quadrant 1b, quadrant 2b, quadrant 3b, and quadrant 4b.

As discussed above with reference to FIG. 2, second photodetector 54 may also be a quadrant photodiode. Second photodetector 54 may be circular with quadrant 1b, quadrant 2b, quadrant 3b, and quadrant 4b arranged such that quadrant 1b forms the northeast quadrant of second photodetector 54, quadrant 2b forms the northwest quadrant of second photodetector 54, quadrant 3b forms the southwest quadrant of second photodetector 54, and quadrant 4b forms the southeast quadrant of second photodetector 54. A small gap aligned with the x-axis separates quadrants 1b and 2b from quadrants 3b and 4b. A small gap aligned with the z-axis and the center line of fleet angle sensor 20 separates quadrant 1b from quadrant 2b, and also separates quadrant 3b from quadrant 4b. When no other force other than gravity acts upon cable 18, cable 18 is aligned between quadrant 1b and 2b, and between quadrant 3b and 4b, and second photodetector 54 detects that the position of cable 18 on the x-axis is at zero. As shown in FIG. 6B, should cable 18 swing left relative the z-axis, cable 18 partially shadows quadrants 2b and 3b while quadrants 1b and 4b are fully exposed. As described in greater detail in FIG. 8, second photodetector 54 determines the coordinate of cable 18 on the x-axis between quadrants 2b and 3b by comparing a signal generated by quadrant 1b to a signal generated by quadrant 2b, and also by comparing a signal generated by quadrant 4b to a signal generated by quadrant 3b. As shown in FIG. 6C, should cable 18 swing right relative the z-axis, cable 18 partially shadows quadrants 1b and 4b while quadrants 2b and 3b are fully exposed. As described in greater detail in FIG. 8, second photodetector 54 determines the coordinate of cable 18 on the x-axis between quadrants 1b and 4b by comparing a signal generated by quadrant 1b to a signal generated by quadrant 2b, and also by comparing a signal generated by quadrant 4b to a signal generated by quadrant 3b.

Figure 7:
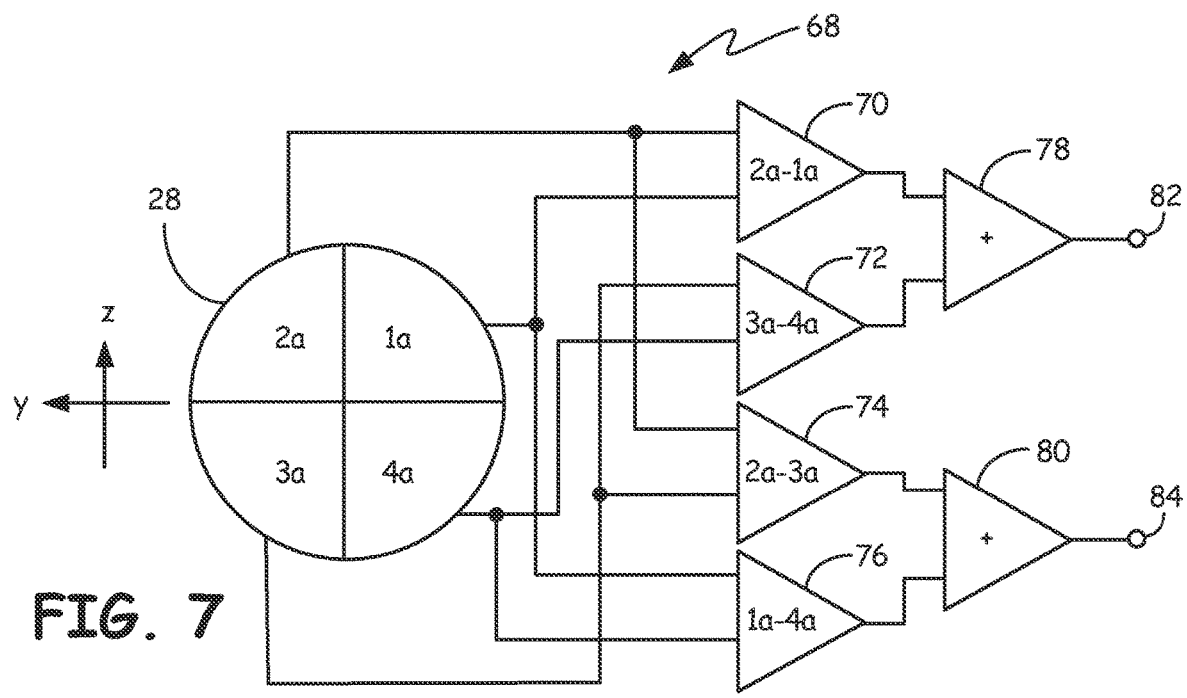
FIG. 7 is a schematic diagram of the first photodetector from FIG. 5A and a first circuit associated with the first photodetector.

FIG. 7 is a schematic diagram of first photodetector 28 from FIG. 5A and first circuit 68 associated with first photodetector 28. As shown in FIG. 7, first photodetector 28 includes multiple light-receiving zones designated as quadrant 1a, quadrant 2a, quadrant 3a, and quadrant 4a. First circuit 68 includes first differential amplifier 70, second differential amplifier 72, third differential amplifier 74, fourth differential amplifier 76, first summing amplifier 78, second summing amplifier 80, first output 82, and second output 84.

First differential amplifier 70 is electrically connected to quadrants 1a and 2a and receives a signal from quadrant 1a and a signal from quadrant 2a. First differential amplifier 70 compares the signal from quadrant 2a to the signal from quadrant 1a by taking the difference of the two signals. First differential amplifier 70 outputs the difference between the signals from quadrants 1a and 2a to first summing amplifier 78. Second differential amplifier 72 is electrically connected to quadrants 3a and 4a and receives a signal from quadrant 3a and a signal from quadrant 4a. Second differential amplifier 72 compares the signal from quadrant 3a to the signal from quadrant 4a by taking the difference of the two signals. Second differential amplifier 72 also outputs the difference between the signals from quadrants 3a and 4a to first summing amplifier 78. First summing amplifier 78 adds the outputs of first differential amplifier 70 and second differential amplifier 72 to obtain first output 82, first output 82 being equal to the y-coordinate of cable 18 on the y-axis. First output 82 can be mathematically characterized by the following equation: First Output $82$=y-coordinate of cable $18$=$(1a+4a)-(2a+3a)$, where $1a$ is the signal from quadrant $1a$, $2a$ is the signal from quadrant $2a$, $3a$ is the signal from quadrant $3a$, and $4a$ is the signal from quadrant $4a$.

Third differential amplifier 74 is electrically connected to quadrants 2a and 3a and receives a signal from quadrant 2a and a signal from quadrant 3a. Third differential amplifier 74 compares the signal from quadrant 2a to the signal from quadrant 3a by taking the difference of the two signals. Third differential amplifier 74 outputs the difference between the signals from quadrants 2a and 3a to second summing amplifier 80. Fourth differential amplifier 76 is electrically connected to quadrants 1a and 4a and receives a signal from quadrant 1a and a signal from quadrant 4a. Fourth differential amplifier 76 compares the signal from quadrant 1a to the signal from quadrant 4a by taking the difference of the two signals. Fourth differential amplifier 76 also outputs the difference between the signals from quadrants 1a and 4a to second summing amplifier 80. Second summing amplifier 80 adds the outputs of third differential amplifier 74 and fourth differential amplifier 76 to obtain second output 84. Second output 84 is equal to the z-coordinate of cable 18 on the z-axis. Second output 84 can be mathematically characterized by the following equation: Second Output $84$=z-coordinate of cable $18$=$(1a+2a)-(3a+4a)$, where $1a$ is the signal from quadrant $1a$, $2a$ is the signal from quadrant $2a$, $3a$ is the signal from quadrant $3a$, and $4a$ is the signal from quadrant $4a$. As discussed above in the description of FIGS. 3 and 4, the z-coordinate of cable 18 inside fleet angle sensor 20 is generally fixed and does not change, thus second output 84 will largely remain unchanged as cable 18 moves from side to side. Second output 84 may be used to normalize first output 82 so as to minimize common mode errors in first output 82. Common mode errors in first output 82 can result from stray light entering fleet angle sensor 20, temperature changes, or dust accumulating on lenses 34 and 36 disclosed in FIG. 2. First output 82 may be normalized by second output 84 by dividing first output 82 by second output 84. Normalized first output 82 can be characterized mathematically by the following equation: Normalized First Output $82$=$[(1a+4a)-(2a+3a)]/[(1a+2a)-(3a+4a)]$, where $1a$ is the signal from quadrant $1a$, $2a$ is the signal from quadrant $2a$, $3a$ is the signal from quadrant $3a$, and $4a$ is the signal from quadrant $4a$. As disclosed in FIG. 8 below, second photodetector 54 is connected to second circuit 86 in a manner similar to first photodetector 28 and first circuit 68.

Figure 8:
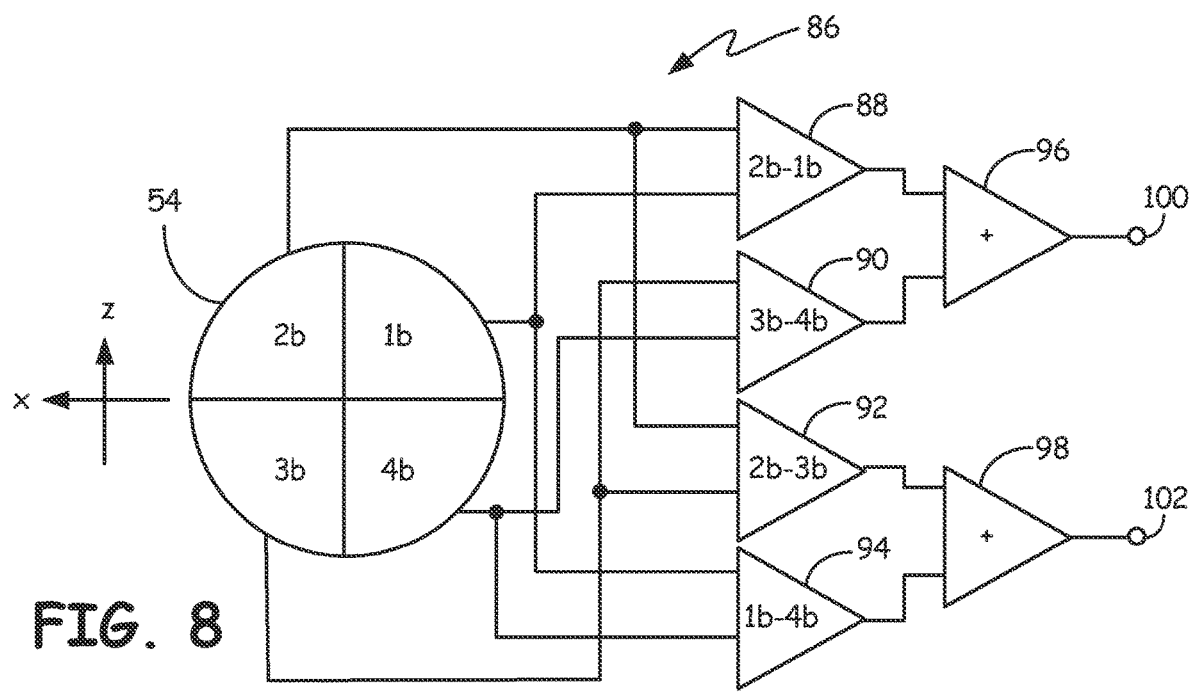
FIG. 8 is a schematic diagram of the second photodetector from FIG. 6A and a second circuit associated with the second photodetector.

FIG. 8 is a schematic diagram of second photodetector 54 from FIG. 6A and second circuit 86 associated with second photodetector 54. As shown in FIG. 8, second photodetector 54 includes multiple light-receiving zones designated as quadrant 1b, quadrant 2b, quadrant 3b, and quadrant 4b.

Second circuit 86 includes first differential amplifier 88, second differential amplifier 90, third differential amplifier 92, fourth differential amplifier 94, first summing amplifier 96, second summing amplifier 98, first output 100, and second output 102.

First differential amplifier 88 is electrically connected to quadrants 1b and 2b and receives a signal from quadrant 1b and a signal from quadrant 2b. First differential amplifier 88 compares the signal from quadrant 2b to the signal from quadrant 1b by taking the difference of the two signals. First differential amplifier 88 outputs the difference between the signals from quadrants 1b and 2b to first summing amplifier 96. Second differential amplifier 90 is electrically connected to quadrants 3b and 4b and receives a signal from quadrant 3b and a signal from quadrant 4b. Second differential amplifier 90 compares the signal from quadrant 3b to the signal from quadrant 4b by taking the difference of the two signals. Second differential amplifier 90 also outputs the difference between the signals from quadrants 3b and 4b to first summing amplifier 96. First summing amplifier 96 adds the outputs of first differential amplifier 88 and second differential amplifier 90 to obtain first output 100, first output 100 equaling the x-coordinate of cable 18 on the x-axis. First output 100 can be mathematically characterized by the following equation: First Output 100=x-coordinate of cable 18=(1b+4b)−(2b+3b), where 1b is the signal from quadrant 1b, 2b is the signal from quadrant 2b, 3b is the signal from quadrant 3b, and 4b is the signal from quadrant 4b.

Third differential amplifier 92 is electrically connected to quadrants 2b and 3b and receives a signal from quadrant 2b and a signal from quadrant 3b. Third differential amplifier 92 compares the signal from quadrant 2b to the signal from quadrant 3b by taking the difference of the two signals. Third differential amplifier 92 outputs the difference between the signals from quadrants 2b and 3b to second summing amplifier 98. Fourth differential amplifier 94 is electrically connected to quadrants 1b and 4b and receives a signal from quadrant 1b and a signal from quadrant 4b. Fourth differential amplifier 94 compares the signal from quadrant 1b to the signal from quadrant 4b by taking the difference of the two signals. Fourth differential amplifier 94 also outputs the difference between the signals from quadrants 1b and 4b to second summing amplifier 98. Second summing amplifier 98 adds the outputs of third differential amplifier 92 and fourth differential amplifier 94 to obtain second output 102. Second output 102 is equal to the z-coordinate of cable 18 on the z-axis. Second output 102 can be mathematically characterized by the following equation: Second Output 102=z-coordinate of cable 18=(1b+2b)−(3b+4b), where 1b is the signal from quadrant 1b, 2b is the signal from quadrant 2b, 3b is the signal from quadrant 3b, and 4b is the signal from quadrant 4b. As discussed above in the description of FIGS. 3 and 4, the z-coordinate of cable 18 inside fleet angle sensor 20 is generally fixed and does not change, thus second output 102 will largely remain unchanged as cable 18 moves from side to side. Second output 102 may be used to normalize first output 100 so as to minimize common mode errors in first output 100. As discussed above in the description of FIG. 7, common mode errors in first output 100 can result from stray light entering fleet angle sensor 20, temperature changes, or dust accumulating on lenses 60 and 62 disclosed in FIG. 4. First output 100 may be normalized by second output 102 by dividing first output 100 by second output 102. Normalized first output 100 can be characterized mathematically by the following equation: Normalized First Output 100=[(1b+4b)−(2b+3b)]/[(1b+2b)−(3b+4b)], where 1b is the signal from quadrant 1b, 2b is the signal from quadrant 2b, 3b is the signal from quadrant 3b, and 4b is the signal from quadrant 4b.

In view of the foregoing description, it will be recognized that the present disclosure provides numerous advantages and benefits. For example, the present disclosure provides fleet angle sensor 20 for measuring the fleet angle of cable 18 of winch assembly 12. Fleet angle sensor 20 includes first photodetector 28 and second photodetector 54. First photodetector 28 is a quadrant photodiode, and second photodetector 54 is a quadrant photodiode. As quadrant photodiodes, first photodetector 28 and second photodetector 54 are able to accurately measure the fleet angle of cable 18 with a degree of resolution and an extremely fast response time. It is estimated that fleet angle sensor 20 is able to measure the fleet angle of cable 18 within a tenth of a degree. Furthermore, fleet angle sensor 20 is also relatively small and simple in design, giving fleet angle sensor 20 a small profile on winch assembly 12.

While the invention has been described with reference to an exemplary embodiment(s), it will be understood by those skilled in the art that various changes may be made and equivalents may be substituted for elements thereof without departing from the scope of the invention. For example, while the specification describes frame 24 as an annular ring, frame 24 could be rectangular in geometry. Additionally, while first photodetector 28 and second photodetector 54 have been described in the specification as each having four quadrants, first photodetector 28 and second photodetector 54 may have as few as two light-receiving zones or light-active sectors. First photodetector 28 and second photodetector 54, while described as quadrant photodiodes by the specification, could include any kind of light-receiving device or plurality of light-receiving devices arrayed into multiple light-receiving zones. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An angle sensor comprising:
   a frame;
   a first light source disposed on the frame;
   a first quadrant photodiode disposed on the frame opposite the first light source;
   a second light source disposed on the frame;
   a second quadrant photodiode disposed on the frame opposite the second light source;
   a circuit connected to the first and second quadrant photodiodes for determining angular orientation of a cable passing through the frame based on signals from the first and second quadrant photodiodes; and
   a shield device under the frame, wherein the shield device comprises:
   a shield frame under the frame of the fleet angle sensor; and
   a cover extending from the shield frame toward a center axis of the angle sensor, wherein the cover is a flexible diaphragm extending from an inside surface of the shield frame toward the center axis of the angle sensor, wherein the flexible diaphragm comprises a hole on the center axis of the angle sensor.

2. The angle sensor of claim 1, wherein the shield frame tapers from the frame to the cover.

3. The angle sensor of claim 1, wherein the first light source is circumferentially positioned on the frame nonparallel from the second light source, and the first quadrant photodiode is circumferentially positioned on the frame nonparallel from the second quadrant photodiode.

4. An angle sensor comprising:
- a frame;
- a first light source disposed on the frame;
- a first quadrant photodiode disposed on the frame opposite the first light source;
- a second light source disposed on the frame;
- a second quadrant photodiode disposed on the frame opposite the second light source;
- a circuit connected to the first and second quadrant photodiodes for determining angular orientation of a cable passing through the frame based on signals from the first and second quadrant photodiodes; and
- a shield device under the frame, wherein the shield device comprises:
  - a shield frame under the frame of the fleet angle sensor; and
  - a cover extending from the shield frame toward a center axis of the angle sensor, wherein the cover comprises bristles extending from an inside surface of the shield frame towards the center axis of the angle sensor, and wherein the bristles are arranged in multiple layers.

* * * * *